United States Patent [19]

Pourailly et al.

[11] Patent Number: 5,424,748
[45] Date of Patent: Jun. 13, 1995

[54] RADAR ANTENNA SUITABLE FOR DESIGNATION AND TRAJECTOGRAPHY RADAR

[75] Inventors: Jean-Louis Pourailly, Vincennes; Joseph Roger, Bures S/Yvette, both of France

[73] Assignee: Thomson-CSF, Puteaux, France

[21] Appl. No.: 145,612

[22] Filed: Nov. 4, 1993

[30] Foreign Application Priority Data

Nov. 6, 1992 [FR] France ................. 92 13393

[51] Int. Cl.$^6$ ............................................. G01S 13/00
[52] U.S. Cl. ..................................... 342/157; 342/154
[58] Field of Search ............... 342/372, 377, 425, 154, 342/157

[56] References Cited

U.S. PATENT DOCUMENTS

| | | |
|---|---|---|
| 3,778,824 | 12/1973 | Roger . |
| 3,797,020 | 3/1974 | Roger et al. . |
| 3,965,475 | 6/1976 | Deerkoski et al. ............ 343/853 |
| 4,402,049 | 8/1983 | Gray ............................ 364/447 |
| 4,868,886 | 9/1989 | Assal et al. .................... 455/12 |
| 4,881,078 | 11/1989 | Yamane et al. ............... 342/155 |
| 5,008,677 | 4/1991 | Trigon et al. . |
| 5,034,752 | 7/1991 | Pourailly et al. . |
| 5,036,336 | 7/1991 | Bouko et al. . |
| 5,038,149 | 8/1991 | Aubry et al. . |
| 5,049,893 | 9/1991 | Coppier et al. . |
| 5,063,363 | 11/1991 | Coppier et al. . |
| 5,138,324 | 8/1992 | Aubry et al. . |
| 5,146,616 | 9/1992 | Tang et al. ..................... 455/103 |
| 5,170,174 | 12/1992 | Caer et al. . |
| 5,172,128 | 12/1992 | Bouko et al. . |

OTHER PUBLICATIONS

Patent Abstracts of Japan, vol. 15, No. 480, (P-1284) Dec. 5, 1991, Youichi Kaneko, "Multibeam Antenna".
Patent Abstracts of Japan, vol. 8, No. 115 (E-247)(1552) May 29, 1984, & JP-A-59 028 703, Achinami Yasuske, "Method and Apparatus for Controlling Beam".

*Primary Examiner*—Theodore M. Blum
*Attorney, Agent, or Firm*—Oblon, Spivak, McClelland, Maier & Neustadt

[57] ABSTRACT

A radar antenna includes a reception part constituted by elementary antennas, each elementary antenna delivering a reception signal to a computer for the formation of simultaneous radar beams by computation, and a transmission and reception part constituted by at least one elementary antenna. The computer uses the signals received by the elementary antennas of the reception part to form a set of radar beams within a solid angle radar beam formed by the elementary antennas of the transmission and reception part. The radar antenna finds particular application in the field of designation and trajectography radar.

9 Claims, 4 Drawing Sheets

RADAR ANTENNA SUITABLE FOR DESIGNATION AND TRAJECTOGRAPHY RADAR

BACKGROUND OF THE INVENTION

1. Field of the Invention

The present invention relates to an antenna for radars. It can be applied notably to designation and trajectography radars wherein the designation function consists, for example, in keeping watch in a limited solid angle that makes it possible, in the event of detection, to give an approximate direction of this target. More generally, it can be applied to all radars one of whose functions requires precise localization of targets and swift reaction to instances of detection.

To attain high acuity, antennas need to be large-sized in order to obtain thin beams. Furthermore, high precision of detection calls for sufficient rigidity and stability of the mechanical structure of the antenna. Finally the requirement of short reaction times means that these antennas should rotate and take position swiftly. In the range of frequencies of the L band for example, these constraints become difficult to meet, notably because of the large sizes brought into play, as well as the weights of the antennas. In the latter case, the mechanical servo-control systems are particularly ill-suited to meeting the constraints of speed and mechanical precision.

Examples of antenna structures seeking to meet the above-mentioned constraints are known. These antennas are notably designed for target designation and trajectography radars. A known structure consists of a paraboloidal antenna, large-sized in relation to the wavelength, that can be swivelled by means of a turret. The designation function is obtained by the mechanical shifting of the reflector of the antenna, the axis of which explores the angular zone to be watched. However, in this case, the watch is sequential and hence slow. Furthermore, the making of the structures is difficult, notably because the volume and weight of the assembly are great and because the servomechanisms have to ensure that the positions are obtained with high precision.

Another known embodiment consists of the use of an electronic scanning antenna which, by means of its phase-shifters, can shift the axis of its beam speedily. The watching time is thus reduced, but this is a expensive approach, notably because of the large number of phase-shifters needed. Furthermore, in this case, it is difficult for the antenna to carry out a self-calibration. The absence of this possibility of self-calibration means that great care must be taken in the manufacture of such antennas, and this tends to further increase their cost.

SUMMARY OF THE INVENTION

The aim of the invention is to overcome the above-mentioned drawbacks, notably by enabling radars to obtain high acuity, high precision and fast reaction times.

To this end, an object of the invention is an antenna for radars comprising at least one part designed for reception constituted by elementary antennas, each connected to a receiver delivering a reception signal to a computer for the formation of beams by computation and a part designed for transmission and reception constituted by at least one elementary antenna, the computer forming, from the signals received by the elementary antennas of the part designed for reception, a set of simultaneous beams in a solid angle formed by the beam of the elementary antenna of the part designed for transmission and reception.

The chief advantages of the invention are that it enables the simplifying of the mechanical structures of the antennas, notably designed for the simultaneous designation and trajectography of multiple targets, that it enables antenna self-calibrations to be carried out and that it reduces the cost of these structures.

BRIEF DESCRIPTION OF THE DRAWINGS

Other features and advantages of the invention shall appear from the following description made with reference to the appended drawings, of which.

DETAILED DESCRIPTION OF THE PREFERRED EMBODIMENTS

Figure 1:
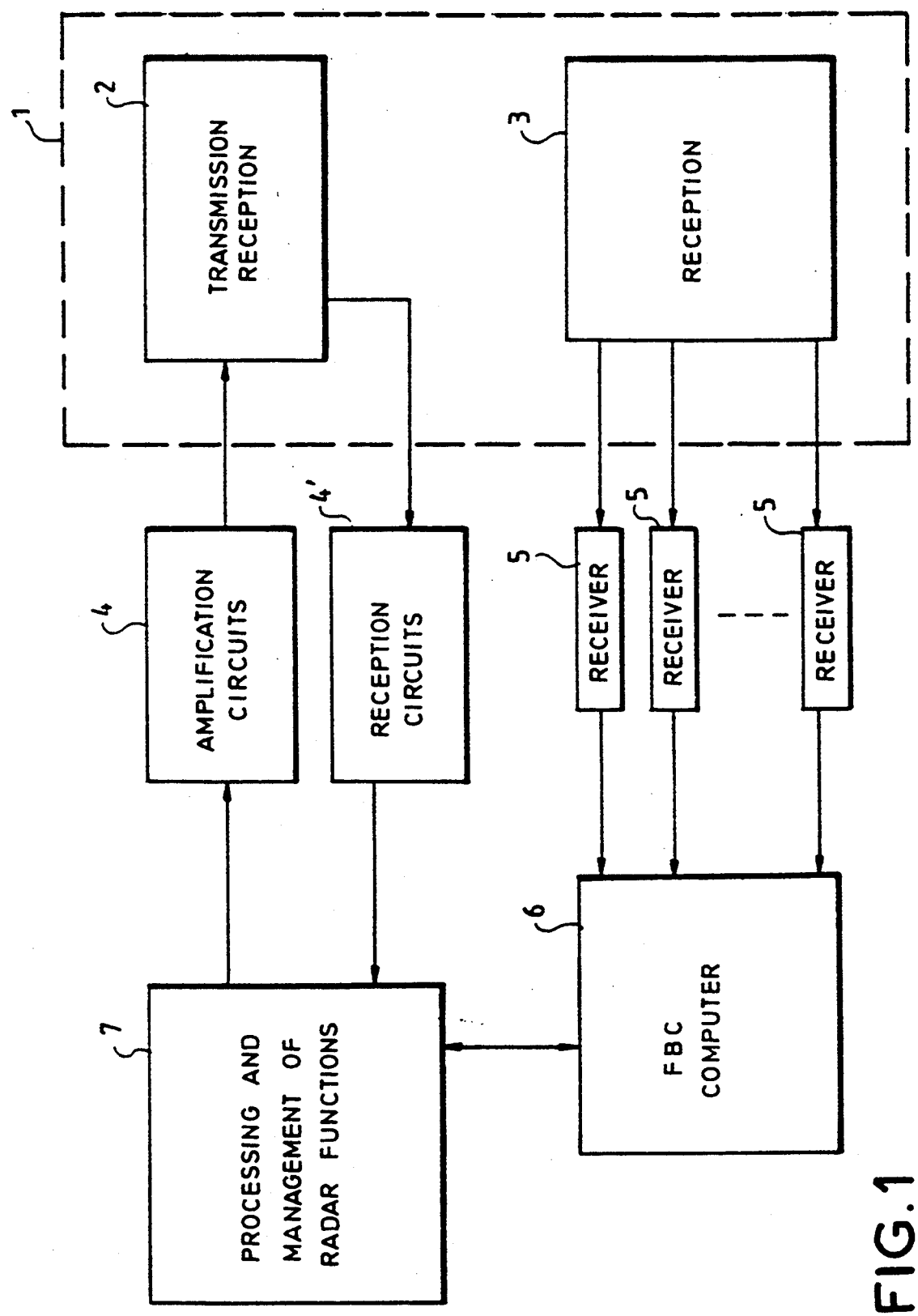
FIG. 1 is a block diagram of the operation of an antenna according to the invention.

FIG. 1 shows a block diagram of the operation of an antenna according to the invention. The antenna 1 is constituted by two distinct parts: a part 2 designed for transmission and reception and a part 3 designed for reception. The transmission and reception part 2 comprises at least one elementary antenna and is connected to amplification circuits 4 and to reception circuits 4'. The reception part comprises several elementary antennas, N in number for example, each connected to an elementary receiver 5. Each elementary receiver 5 comprises, for example, a low-noise amplifier, frequency transposition circuits and one or more analog-digital encoders. These elementary receivers 5 are connected to the input of a computer 6 for the formation of beams by computation, hereinafter called an FBC computer. This computer 6 enables the formation of simultaneous beams at reception using the signals received by the N elementary reception antennas. These signals pass through the elementary receivers 5 and are, in particular, digitized. To form a beam in a direction defined by a vector $\vec{u}$, the computer 6 carries out, for example, the following computation:

$$\sum_{i=1}^{N} S_i e^{j\frac{2\pi}{\lambda}<OM_i,u>}$$

where:

$\lambda$ represents the wavelength of the received signals, $S_i$ represents the signal received by an elementary i order antenna among the N reception antennas, i being a whole number smaller than or equal to N;

$<OM_i, \vec{u}>$ represents the scalar product of the vector $\vec{u}$ and of a vector $OM_i$ formed from the point of origin O of the direction $\vec{u}$ and a point $M_i$ representing the location of an i order antenna. The N elementary reception antennas are located, for example, in one and the same plane.

The FBC computer 6 forms a set of simultaneous beams occupying the solid angle of the transmission beam formed out of the transmission and reception part 2 of the antenna according to the invention.

Means 7 for the processing and management of radar functions are connected, for example, to the amplification circuits 4 and to the FBC computer 6. These means 7 process the signals received and detected in the beams formed by the FBC computer 6. They control computer 6 as well as the amplification circuits, for example.

Figure 2:
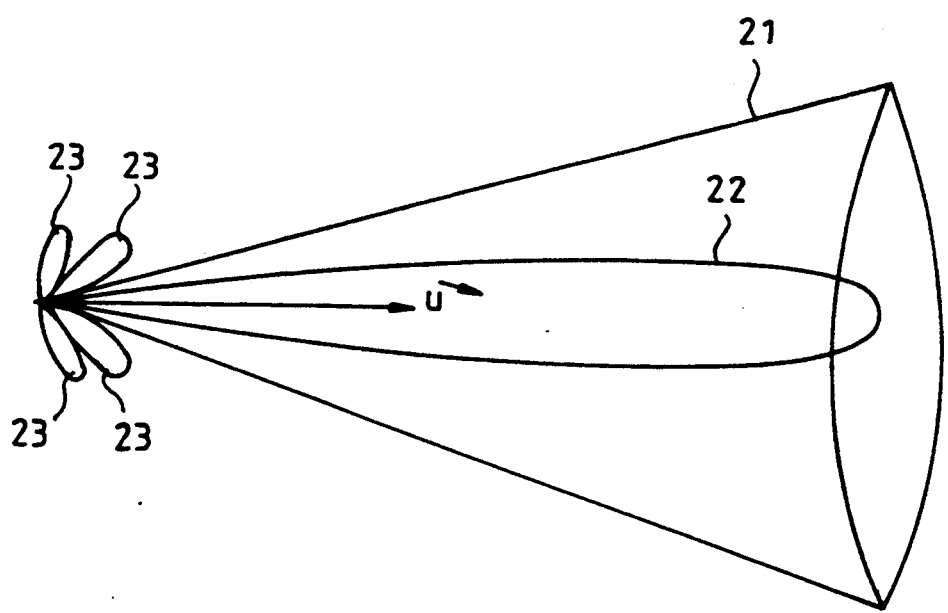
FIG. 2 illustrates transmission and reception beams of an antenna according to the invention.

FIG. 2 illustrates the transmission and reception beams according to the invention. A first beam 21 constitutes a solid angle. This beam 21, formed from the transmission and reception part 2 of the antenna according to the invention, illuminates targets. To ensure a range of detection that is as wide as possible, this angle must be as wide as possible. To this end, it may be formed by a small-sized elementary transmission antenna.

A second beam 22 in the above-mentioned direction $\bar{u}$, thinner than the foregoing beam, is inside it and constitutes a reception beam. This reception beam 22 is obtained by computation by the FBC computer 6. This computer 6 enables the shifting, by computation, of the reception beam 22 inside the transmission beam 21. Several reception beams may be created simultaneously inside the transmission beam 21. The reception beam 22 enables the localization, with precision, of a target detected in the transmission beam 21. To improve this localization, the side lobes 23 of the reception beam 22 should preferably be outside the solid angle formed by the first beam 21, thus preventing cases of parasitic detection. To this end, the elementary reception antennas may be positioned, for example, in concentric circles.

The following, for example, is a possible mode of operation of an antenna according to the invention: a target illuminated by a first beam 21 is, for example, detected. Then, this target is localized with precision by means of one or more thinner simultaneous beams of the same type as the second beam 22 that are contained in the first beam 21 and obtained by means of the FBC computer 6, this localizing being then achieved by computations known to those skilled in the art. This precise localization makes it possible, notably, to execute a designation function.

Figure 3:
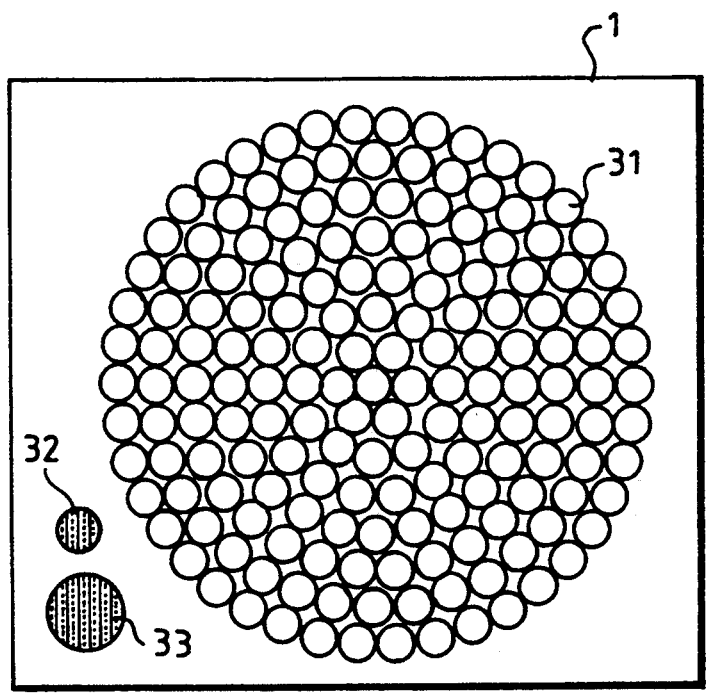
FIG. 3 shows a possible embodiment of an antenna according to the invention.

FIG. 3 shows a possible embodiment of an antenna according to the invention. The reception part of the antenna 1 is constituted by paraboloid elements arranged in concentric circles. Each of them, constituting an elementary antenna, is connected to an elementary receiver 5. The transmission and reception part is constituted, for example, by two paraboloid elements 32, 33 having different radii. A first paraboloid element 32 with the smaller radius may be used, for example, for watching operations by means of the transmission beam that it generates, which is wider than the beam of the second paraboloid element 33, this second paraboloid beam 33 having a greater radius than the first paraboloid element 32. The second paraboloid element 33 may be used, for example, for tracking operations. The radius of the first paraboloid element 32 may be equal, for example, to the radius of the paraboloid elements 31 of the reception part. The radius of the second paraboloid element 33 may be, for example, equal to or double that of the first paraboloid element 32. It is possible to carry out both watching and monitoring operations by replacing these two paraboloid elements 32, 33 with a single paraboloid element having, for example, a radius equal to 1.5 times the radius of the first paraboloid element 32. The diameter of the paraboloid element used for transmission is determined notably by the solid angle $\theta \times \theta$ to be covered by the transmission beam. In the case of the use of two paraboloid elements 32, 33, the radius of the first paraboloid element 32 may be defined, for example, so as to cover this solid angle, and is therefore equal to $\lambda/\theta$ where $\lambda$ is the transmission wavelength.

When there is a detected target, a formation of monopulse beams of the sum/difference type in relative bearing and of the difference type in elevation, known to those skilled in the art, in the vicinity of the direction of the target, can be used to obtain excellent measurements of the real direction of this target, especially for trajectography functions. The target is detected by means of the wide beams obtained from the paraboloid elements 32, 33 of the transmission and reception part, and the measurement is made by means of the beams formed by the FBC computer from the reception paraboloid elements 31.

Figure 4:
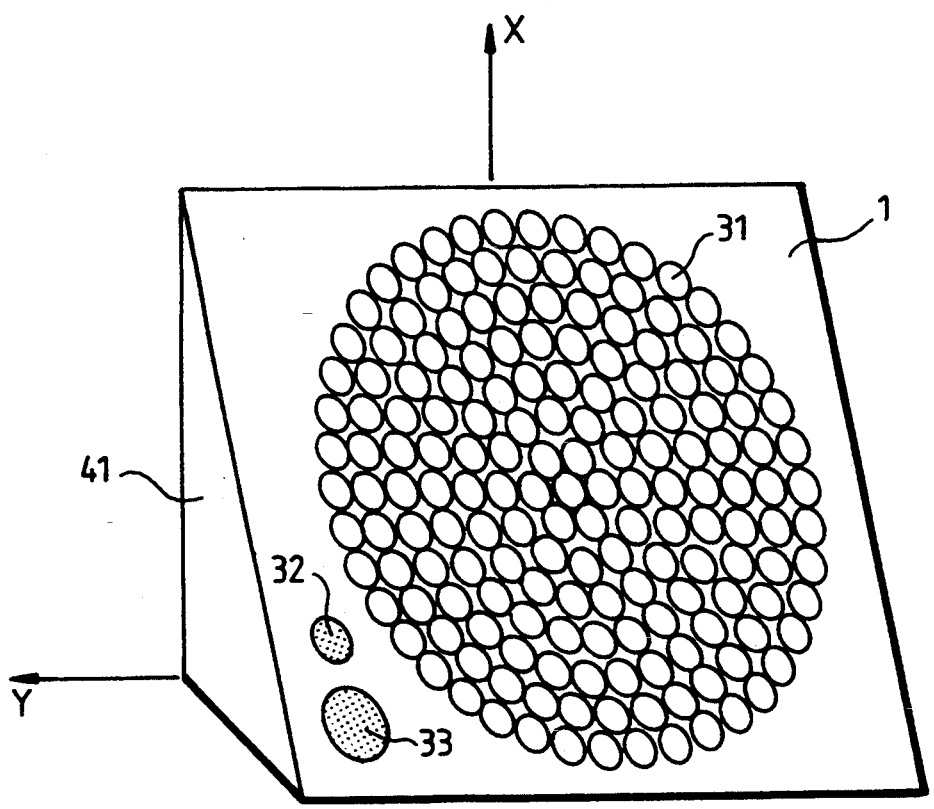
FIG. 4 shows the foregoing antenna positioned on a rotating support.

FIG. 4 shows the antenna 1 of FIG. 3 positioned on a rotating support 41. This support rotates, for example, about a first axis x to enable the antenna 1 to carry out a scanning in relative bearing and about a second axis y, perpendicular to the foregoing axis, to carry out a scanning in elevation.

It is possible to carry out self-calibration operations, using a known beacon for example. These self-calibration operations can be used notably to compute the coefficients and parameters used to prepare the operations of formation of beams by computation. These coefficients and these parameters may be stored, for example, in the FBC computer 6.

Self-calibration makes it possible notably to overcome constraints related to making precise mechanical structures thus making it possible, besides, to reduce manufacturing costs. Nor is it of no value to carry out a mechanical servocontrol of the antenna that is very precise and performs very well. The precision and speed of the positioning are indeed obtained by the beams formed by means of the FBC computer 6.

Alternative embodiments of the antenna according to the invention may be envisaged. The two antenna parts may be placed on different rotating supports for example, the part designed for reception being placed on a first support and the part designed for transmission and reception being placed on a second support. The paraboloid elements 31 of the part designed for reception may have, for example, diameters of different values. The paraboloid elements 31, 32, 33 of the antenna may be replaced by antennas with active modules. They may also be replaced by electronic scanning antennas. This makes it possible notably to avoid or to restrict the use of rotating supports. This also increases the speed of access to solid angles of the space to be analyzed or monitored.

The primary sources supplying the elementary antennas or the paraboloid elements 31, 32, 33 may be bipolarization sources for example. This notably increases the probability of detection and the capacity of identification of a target. These primary sources may also be multiband sources for example, or several primary sources may function in different frequency bands and may be offset in the focal plane of the paraboloid elements. This makes it possible notably to choose the frequency band best suited to a solid angle of designation or to the desired precision of deviation measurement.

The reception circuits 4' may be eliminated, for example. In this case, the paraboloid elements 32 and 33 carry out only the transmission and the paraboloid elements 31 carry out the reception for the detection, designation and trajectography of the targets.

What is claimed is:

1. A radar antenna comprising:
   reception means constituted by at least one elementary antenna, each one of said at least one elementary antenna delivering a reception signal to a computer which forms simultaneous radar beams by computation; and
   transmission and reception means constituted by at least one elementary antenna, for generating a solid angle radar beam, wherein said simultaneous radar beams formed by said computer are positioned within said solid angle radar beam.

2. A radar antenna according to claim 1, wherein said at least one elementary antenna of said reception means are positioned within a circular area.

3. A radar antenna according to claim 1, wherein said elementary antennas of said reception means and said transmission and reception means are paraboloid elements.

4. A radar antenna according to claim 3, wherein said transmission and reception means comprises two paraboloid elements having different diameters, the smaller diameter being equal to a diameter of said paraboloid elements of said reception means.

5. A radar antenna according to claim 1, wherein said reception means, said transmission and reception means, and said computer are placed on a rotating tray.

6. A radar antenna according to claim 1, wherein said reception means, said transmission and reception means, and said computer are each placed on distinct rotating supports.

7. A radar antenna according to claim 1, wherein said elementary antennas of said reception means and said transmission and reception means comprise active modules.

8. A radar antenna according to claim 1, wherein said elementary antennas of said reception means and said transmission and reception means are electronic scanning antennas.

9. A radar antenna according to claim 1, wherein said solid angle radar beam generated by said transmission and reception means detects and illuminates a target and said simultaneous radar beams formed by said computer localize said target with precision.

* * * * *